United States Patent
Costo et al.

(10) Patent No.: US 8,000,278 B2
(45) Date of Patent: *Aug. 16, 2011

(54) DE-ACTIVATION, AT LEAST IN PART, OF RECEIVER, IN RESPONSE, AT LEAST IN PART, TO DETERMINATION THAT AN IDLE CONDITION EXISTS

(75) Inventors: Avi Costo, Haifa (IL); Mickey Gutman, Zichron-Yaacov (IL); Vicky Sigler, Naharyia (IL); Yaniv Hadar, Yehud (IL)

(73) Assignee: Intel Corporation, Santa Clara, CA (US)

( * ) Notice: Subject to any disclaimer, the term of this patent is extended or adjusted under 35 U.S.C. 154(b) by 1046 days.

This patent is subject to a terminal disclaimer.

(21) Appl. No.: 10/436,547

(22) Filed: May 12, 2003

(65) Prior Publication Data
US 2004/0228275 A1 Nov. 18, 2004

(51) Int. Cl.
G08C 17/00 (2006.01)
H04L 12/28 (2006.01)
H04L 12/56 (2006.01)
H04L 12/413 (2006.01)
H04J 3/12 (2006.01)

(52) U.S. Cl. ............ 370/311; 370/395.2; 370/445; 370/522

(58) Field of Classification Search .......... 370/230, 370/453–459, 346–348, 350, 236, 311, 395.2, 370/400–402, 231, 235, 359, 389, 362, 445, 370/522; 709/223, 224, 250
See application file for complete search history.

(56) References Cited

U.S. PATENT DOCUMENTS

| | | | |
|---|---|---|---|
| 4,740,992 A | | 4/1988 | Havens et al. |
| 4,910,507 A | * | 3/1990 | Shimizu et al. ............... 370/419 |
| 4,968,978 A | | 11/1990 | Stolarczyk |
| 5,241,542 A | * | 8/1993 | Natarajan et al. ............. 370/311 |
| 5,276,703 A | * | 1/1994 | Budin et al. .................. 375/130 |
| 5,754,870 A | | 5/1998 | Pollard et al. |

(Continued)

FOREIGN PATENT DOCUMENTS

EP 0514583 A1 8/1991

(Continued)

OTHER PUBLICATIONS

IEEE, 'Part II: Wireless LAN Medium Access Control (MAC) and Physical Layer (PHY) specifications., IEEE Standard., Jun. 26, 1997, pp. 1-1, 34-59, 100-137., XP002302241 Online—URL:http// ieeexplore.ieee.org.

(Continued)

Primary Examiner — Xavier Szewai Wong
(74) Attorney, Agent, or Firm — Blakely, Sokoloff, Taylor & Zafman LLP (57) ABSTRACT

In one embodiment, a method is provided. In the method of this embodiment, in response, at least in part, to a determination that an idle condition exists, one or more packets may be transmitted to indicate, at least in part, that a transmitter is desired to refrain from transmitting, during one or more predetermined time intervals, to a receiver. Also in the method of this embodiment, also in response, at least in part, to the determination that the idle condition exists, the receiver may be de-activated, at least in part, during the one or more predetermined time intervals. Of course, many alternatives, variations, and modifications are possible without departing from this embodiment.

22 Claims, 5 Drawing Sheets

U.S. PATENT DOCUMENTS

| | | | |
|---|---|---|---|
| 5,768,352 A | | 6/1998 | Elliott et al. |
| 5,790,057 A | * | 8/1998 | Linde et al. ................. 341/68 |
| 6,052,411 A | * | 4/2000 | Mueller et al. ............. 375/222 |
| 6,278,864 B1 | | 8/2001 | Cummins et al. |
| 6,496,516 B1 | * | 12/2002 | Dabecki et al. ............ 370/460 |
| 6,496,869 B1 | | 12/2002 | Cheng |
| 6,591,368 B1 | | 7/2003 | Ryu |
| 6,680,950 B1 | * | 1/2004 | Nagata et al. ............. 370/461 |
| 6,690,655 B1 | | 2/2004 | Miner et al. |
| 6,848,059 B2 | * | 1/2005 | Bullman et al. ............ 713/323 |
| 6,862,674 B2 | | 3/2005 | Dice et al. |
| 6,956,852 B1 | * | 10/2005 | Bechtolsheim et al. ...... 370/389 |
| 6,968,158 B1 | | 11/2005 | Bhuta et al. |
| 6,980,616 B1 | | 12/2005 | Nakano et al. |
| 7,043,578 B2 | | 5/2006 | Hufferd |
| 7,082,129 B2 | | 7/2006 | Cromer et al. |
| 7,308,051 B2 | * | 12/2007 | Boles .......................... 375/340 |
| 7,333,838 B2 | * | 2/2008 | Pattabiraman et al. ....... 455/574 |
| 7,346,321 B2 | * | 3/2008 | Backes ...................... 455/226.1 |
| 7,613,160 B2 | * | 11/2009 | Kitchin ....................... 370/345 |
| 2001/0035994 A1 | * | 11/2001 | Agazzi et al. ............... 359/152 |
| 2002/0080792 A1 | | 6/2002 | Rosier |
| 2002/0132603 A1 | * | 9/2002 | Lindskog et al. ............ 455/343 |
| 2003/0165152 A1 | * | 9/2003 | Mills et al. .................. 370/422 |
| 2003/0198196 A1 | | 10/2003 | Bahl et al. |
| 2003/0206564 A1 | | 11/2003 | Mills et al. |
| 2003/0227874 A1 | | 12/2003 | Wang |
| 2004/0003296 A1 | | 1/2004 | Robert et al. |
| 2004/0008736 A1 | * | 1/2004 | Bae et al. .................... 370/528 |
| 2004/0088590 A1 | | 5/2004 | Lee et al. |
| 2004/0136339 A1 | | 7/2004 | Wentink |
| 2005/0165959 A1 | | 7/2005 | Huff |
| 2007/0105526 A1 | | 5/2007 | Shoobridge |

FOREIGN PATENT DOCUMENTS

| | | |
|---|---|---|
| FR | 2813624 A1 | 4/2000 |
| WO | WO 93/08360 | 4/1993 |
| WO | WO 95/18710 | 7/1995 |

OTHER PUBLICATIONS

Stine J A et al., "Tactical Communications Using the IEEE 802.11 MAC Protocol"., Oct. 18, 1998, Military Communications Conference 1998. IEEE Boston, MA, Oct. 18-21, 1998, New York, pp. 575-582, XP010307881.

PCT/US2004/011647, PCT International Preliminary Report on Patentability and Written Opinion of the International Searching Authority dated Nov. 18, 2005, 6 pages.

PCT/US2004/011647, International Search Report dated Nov. 8, 2004, 3 pages.

* cited by examiner

DE-ACTIVATION, AT LEAST IN PART, OF RECEIVER, IN RESPONSE, AT LEAST IN PART, TO DETERMINATION THAT AN IDLE CONDITION EXISTS

CROSS-REFERENCE TO RELATED APPLICATION

The subject application is related to co-pending U.S. patent application Ser. No. 10/436,793, filed concurrently with the subject application, entitled "De-Activation, At Least In Part, Of Receiver, In Response, At Least In Part, To Determination That An Idle Condition Exists," which co-pending application is assigned to the same Assignee as the subject application.

FIELD

This disclosure relates to the field of de-activation, at least in part, of a receiver, in response, at least in part, to a determination that an idle condition exists.

BACKGROUND

In one conventional network, the network includes a plurality of network nodes. The nodes include network interfaces that are coupled to a communication medium. Each network interface includes receiver circuitry that is capable of receiving, via the communication medium, one or more datagrams.

In this conventional network, there may be significant periods of time during which a given network interface is activated and ready to receive datagrams via the communication medium, but the network interface does not receive any such datagrams via the communication medium. During these periods of time, the receiver circuitry in network interface may consume significant amounts of electrical power.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
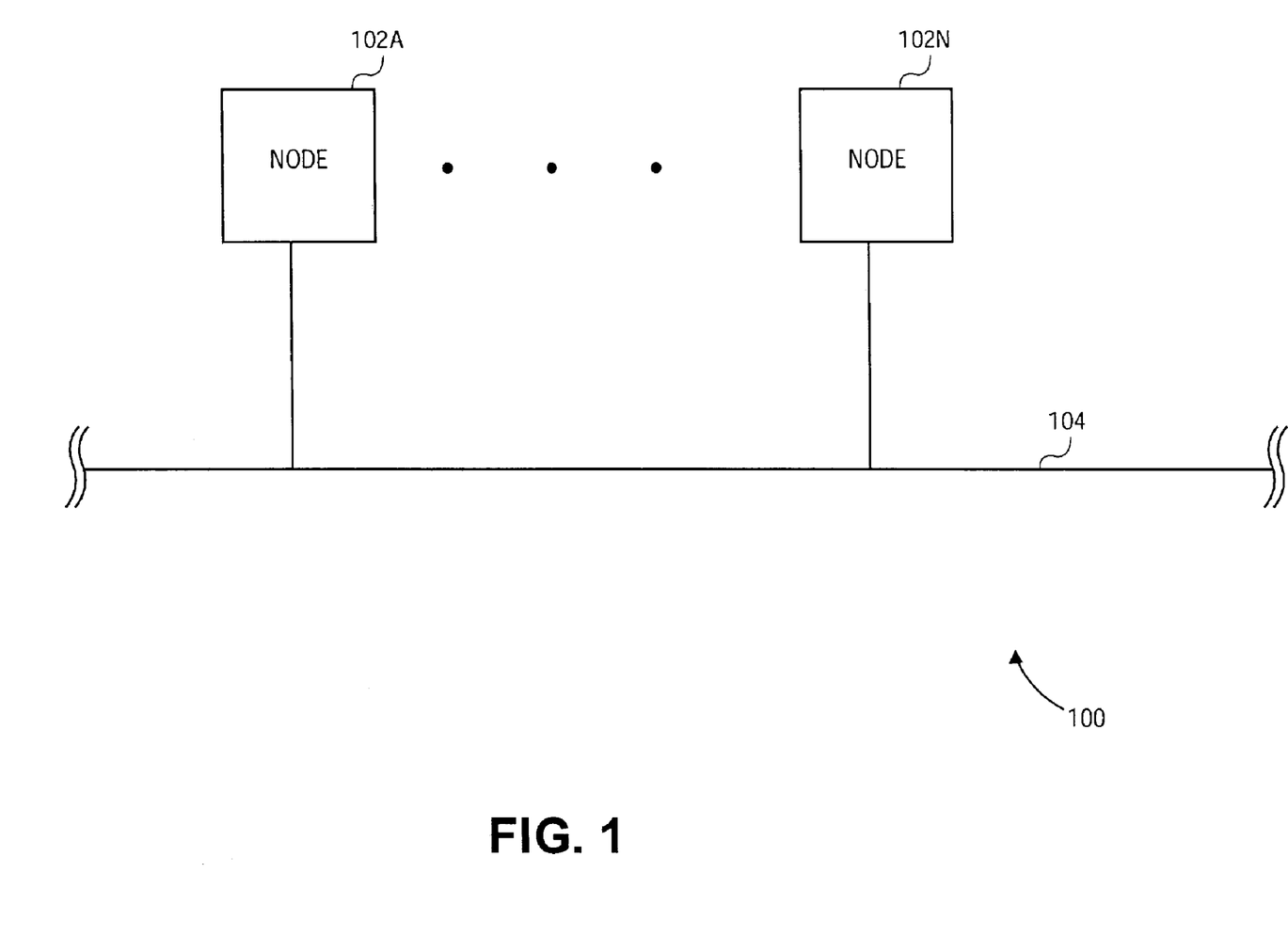
FIG. 1 illustrates a network.

FIG. 1 illustrates one example of a network 100. Network 100 may comprise, for example, one or more computer nodes 102A ... 102N communicatively coupled together via a communication medium 104. Nodes 102A ... 102N may transmit and receive sets of one or more signals via medium 104 that may encode one or more packets.

As used herein, a "packet" means a sequence of one or more symbols and/or values that may be encoded by one or more signals transmitted from at least one sender to at least one receiver. As used herein, a "communication medium" means a physical entity through which electromagnetic radiation may be transmitted and/or received.

Medium 104 may comprise, for example, one or more optical and/or electrical cables, although many alternatives are possible. For example, medium 104 may comprise, for example, air and/or vacuum, through which nodes 102A ... 102N may wirelessly transmit and/or receive sets of one or more signals.

Unless stated to the contrary herein, communications carried out; and signals and/or packets transmitted and/or received among two or more of the nodes 102A ... 102N via medium 104 may be compatible and/or in compliance with an Ethernet communication protocol (such as, for example, a Gigabit Ethernet communication protocol) described in, for example, Institute of Electrical and Electronics Engineers, Inc. (IEEE) Std. 802.3, 2000 Edition, published on Oct. 20, 2000. Of course, alternatively or additionally, such communications, signals, and/or packets may be compatible and/or in compliance with one or more other communication protocols.

Figure 2:
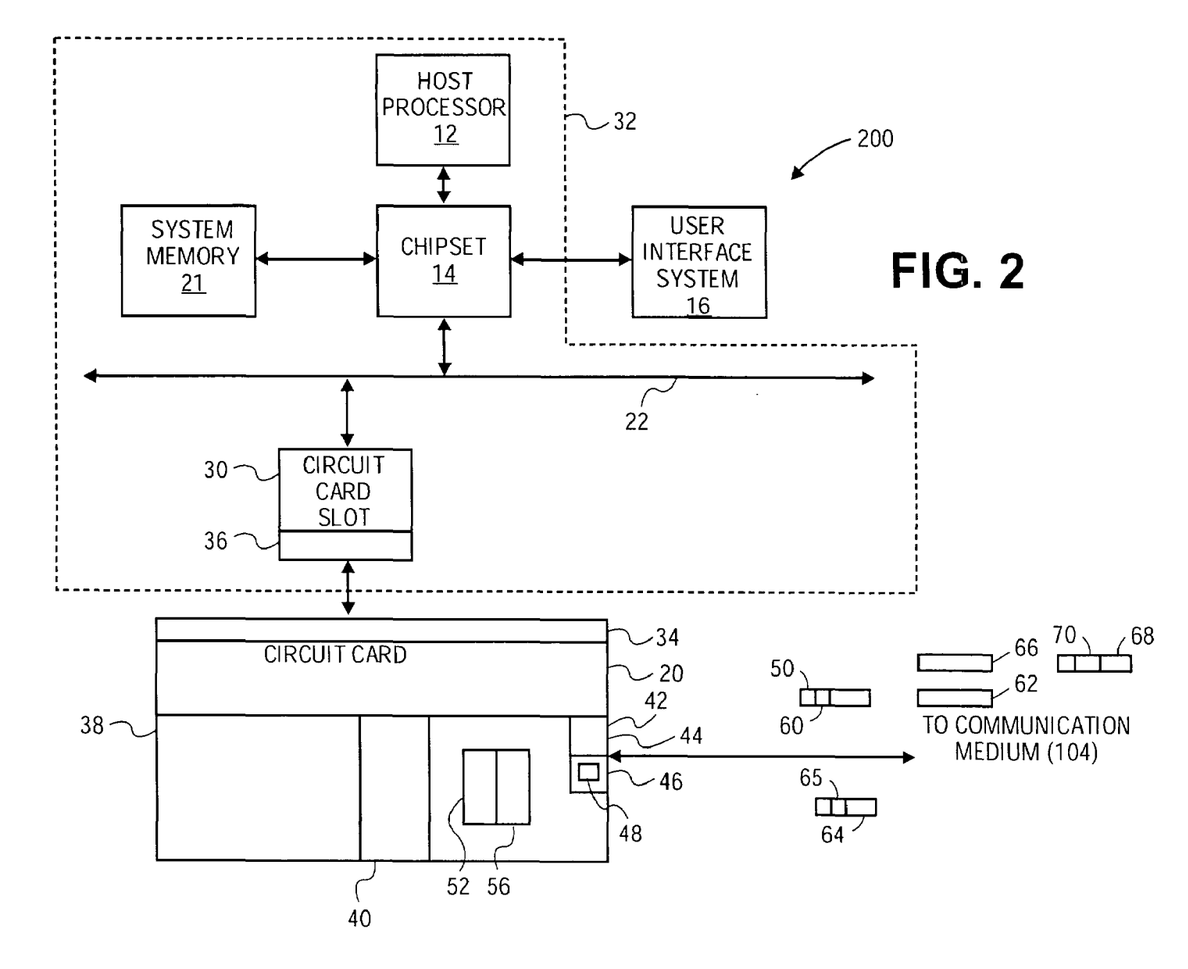
FIG. 2 illustrates a system embodiment.

FIG. 2 illustrates the construction of a system embodiment 200 of the claimed subject matter. In network 100, each of the nodes 102A ... 102N may comprise one or more respective systems that may be substantially identical (e.g., in terms of construction and/or operation) to system 200. Alternatively, without departing from this embodiment, one or more of the nodes 102A ... 102N may not comprise one or more systems that are substantially identical to system 200.

In network 100, one or more the nodes 102A ... 102N may comprise one or more intermediate stations, such as, for example, one or more hubs, switches, and/or routers; additionally or alternatively, one or more of the nodes 102A ... 102N may comprise one or more end stations. Also additionally or alternatively, network 100 may comprise one or more not shown intermediate stations, and medium 104 may communicatively couple together at least some of the nodes 102A ... 102N and one or more of these intermediate stations. Of course, many alternatives are possible.

As shown in FIG. 2, system 200 may include a host processor 12 coupled to a chipset 14. Host processor 12 may comprise, for example, an Intelo Pentium® III or IV microprocessor that is commercially available from the Assignee of the subject application. Of course, alternatively, host processor 12 may comprise another type of microprocessor, such as, for example, a microprocessor that is manufactured and/or commercially available from a source other than the Assignee of the subject application, without departing from this embodiment.

Chipset 14 may comprise a host bridge/hub system that may couple host processor 12, a system memory 21 and a user interface system 16 to each other and to a bus system 22. Chipset 14 may also include an I/O bridge/hub system (not shown) that may couple the host bridge/bus system to bus 22. Chipset 14 may comprise integrated circuit chips, such as those selected from integrated circuit chipsets commercially available from the Assignee of the subject application (e.g., graphics memory and I/O controller hub chipsets), although other integrated circuit chips may also, or alternatively be used. User interface system 16 may comprise, e.g., a keyboard, pointing device, and display system that may permit a human user to input commands to, and monitor the operation of, system 200.

Bus 22 may comprise a bus that complies with the Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Alternatively, bus 22 instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, bus 22 may comprise other types and configurations of bus systems.

Processor 12, system memory 21, chipset 14, PCI bus 22, and circuit card slot 30 may be comprised in a single circuit board, such as, for example, a system motherboard 32. Circuit card slot 30 may comprise a PCI expansion slot that comprises a PCI bus connector 36. Connector 36 may be electrically and mechanically mated with a PCI bus connector 34 that is comprised in circuit card 20. Slot 30 and card 20 may be constructed to permit card 20 to be inserted into slot 30. When card 20 is properly inserted into slot 30, connectors 34 and 36 may become electrically and mechanically coupled to each other. When connectors 34 and 36 are so coupled to each other, operative circuitry 38 in card 20 becomes electrically coupled to bus 22.

When circuitry 38 is electrically coupled to bus 22, host processor 12 may exchange data and/or commands with circuitry 38, via chipset 14 and bus 22 that may permit host processor 12 to control and/or monitor the operation of circuitry 38. Circuitry 38 may include network interface circuitry 40. Circuitry 40 may comprise computer-readable memory 52 and transceiver circuitry 42. Memory 52 may comprise read only and/or random access memory that may store program instructions 56. These program instructions 56, when executed, for example, by operative circuitry 38, network interface circuitry 40, and/or transceiver circuitry 42 may result in, among other things, circuitry 38, circuitry 40, and/or circuitry 42 executing operations that may result in system 200 carrying out the operations described herein as being carried out by system 200.

Without departing from this embodiment, instead of being comprised in card 20, some or all of operative circuitry 38 may be comprised in other structures, systems, and/or devices that may be, for example, comprised in motherboard 32, coupled to bus 22, and exchange data and/or commands with other components in system 200. For example, without departing from this embodiment, chipset 14 may comprise one or more integrated circuits that may comprise operative circuitry 38. Additionally, without departing from this embodiment, system 200 may include a plurality of cards, identical in construction and/or operation to card 20, coupled to bus 22 via a plurality of circuit card slots identical in construction and/or operation to slot 30.

Transceiver circuitry 42 may be communicatively coupled to medium 104. As stated previously, in this embodiment, medium 104 may comprise one or more optical and/or electrical cables. In this embodiment, circuitry 42 may be optically and/or electrically coupled to, and may be capable of transmitting and receiving signals and/or packets via, these one or more cables. More specifically, circuitry 42 may comprise a transmitter 44 and a receiver 46 that may be coupled to medium 104 such that transmitter 44 may transmit, and receiver 46 may receive, respectively, one or more signals and/or packets via medium 104.

Figure 3:
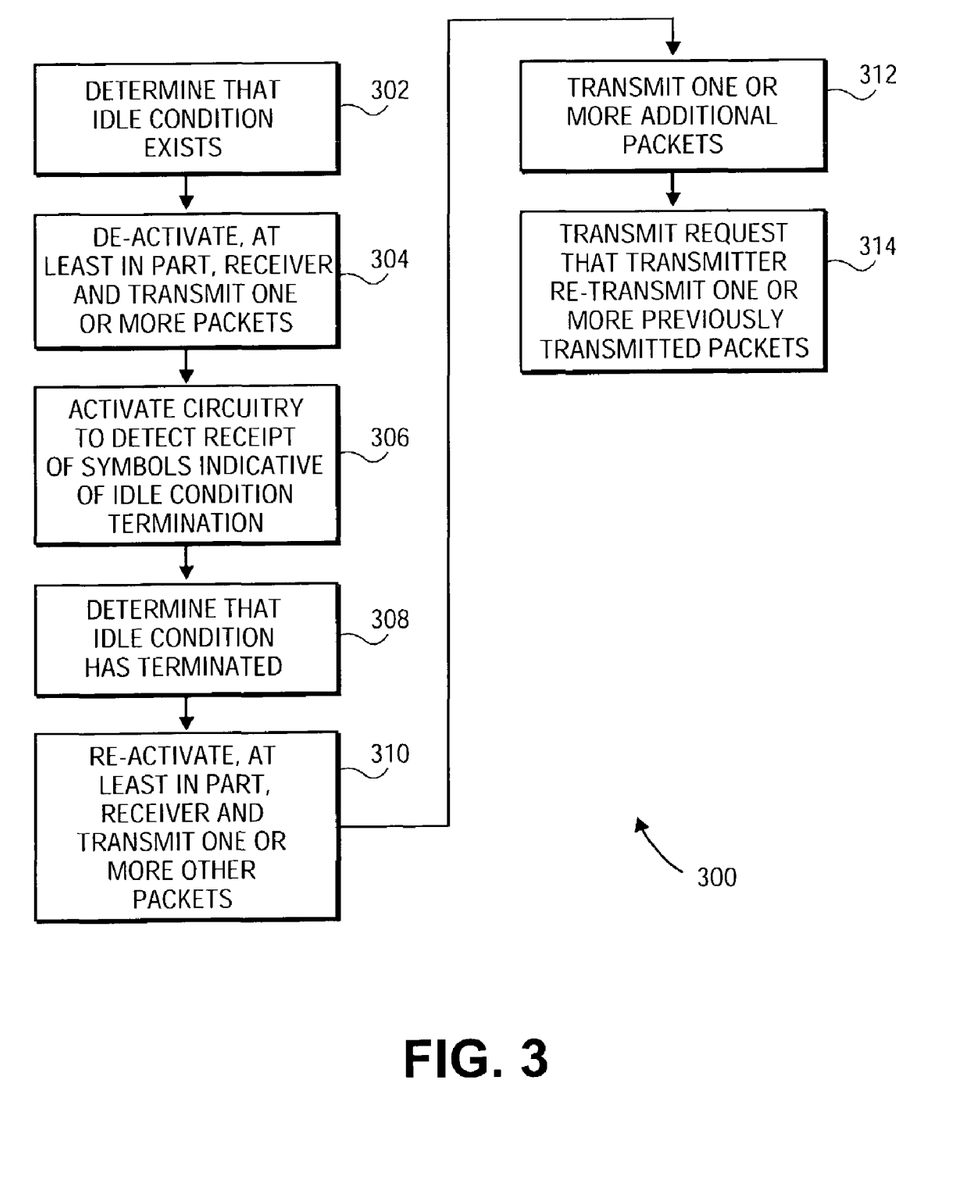
FIG. 3 is a flowchart illustrating operations that may be performed according to an embodiment.

With particular reference now being made to FIG. 3, operations 300 that may be carried out in system 200 in accordance with one embodiment will be described. For purposes of the present discussion, system 200 will be described as being comprised in node 102A. However, as stated previously, each of the nodes 102A . . . 102N in network 100 may comprise a respective system that is identical to system 200. Thus, each of the nodes 102A . . . .102N may be capable of executing respective sets of operations that may be substantially identical to operations 300; these sets of operations may be executed substantially contemporaneously in network 100, alternatively, one or more of these sets of operations may not be executed contemporaneously with one or more other sets of such operations.

After, for example, a reset of card 20 and/or system 200, circuitry 38 may signal circuitry 40. This may result in circuitry 40 attempting to negotiate with one or more network communication partners (e.g., node 102N), for example, in accordance with an Ethernet protocol, initialization of communication with node 102N in accordance with such protocol. More specifically, circuitry 40 may signal circuitry 42. This may result in circuitry 42 transmitting to, and receiving from node 102N one or more packets that may result in and/or embody such negotiation and initialization of communication with node 102N.

Thereafter, as illustrated by operation 302 in FIG. 3, circuitry 38 and/or circuitry 40 are capable of determining whether, and may determine that, an idle condition exists with respect to the communication of circuitry 40 with node 102N. As used herein, an "idle condition" may be said to exist with respect to the communication of a device, if the device has not received (if the device is a receiver) or not transmitted (if the device is a transmitter) one or more packets (other than merely idle packets) within one or more predefined time intervals, such as, for example, a plurality of tens of milliseconds, and/or the device is unlikely to transmit and/or receive one or more packets (other than merely idle packets) within such one or more predefined time intervals, as may be determined, for example, using previously determined statistics related to packet flows in network 100. Also as used herein, when an idle condition exists with respect to the communication of a device, the device may be said to be "idle." Additionally, as used herein, an "idle packet" is a packet that contains and/or encodes one or more symbols and/or values that indicate that prior to the transmission of the idle packet, a transmitter and/or receiver in a device that transmitted the idle packet was idle.

In this embodiment, if circuitry 40 and/or circuitry 38 determine that transmitter 44 and/or receiver 46 are idle, circuitry 40 and/or circuitry 38 may determine, as a result of operation 302, that an idle condition exists in the communication of circuitry 40. Thereafter, in response, at least in part to the determination made as a result of operation 302, circuitry 38 and/or circuitry 40 may signal transceiver circuitry 42. This may result in de-activation, at least in part, of receiver 46, and may also result in transmission by transmitter 44 of one or more packets 50 that may contain one or more symbols and/or values 60 that may indicate to node 102N that receiver 46 is idle, activated, and/or ready to receive one or more packets via medium 104 from node 102N, as illustrated by operation 304 in FIG. 3. As used herein, "de-activating, at least in part" a device means bringing about a change in the state of at least a part of the device that is presently consuming electrical energy and/or power, such that at least that part of the device no longer consumes such energy and/or power. As used herein, "activating, at least in part" a device means changing the state of at least a part of the device that currently is not consuming electrical energy and/or power, such that at least that part of the device consumes such energy and/or power.

After, or contemporaneous with execution of operation 304, the signaling of circuitry 42 by circuitry 38 and/or circuitry 40 also may result in the activation of detector circuitry 48 in receiver 46, as illustrated by operation 306. Detector circuitry 48 may be capable of detecting receipt by receiver 46 of one or more packets 64 transmitted from node 102N that may contain one or more symbols and/or values 65 (e.g., containing one or more symbols and/or values encoding and/or embodying user data and/or one or more commands) that may indicate termination of the idle condition determined to exist as a result of operation 302. For example, circuitry 48 may detect whether a packet received by receiver 46 from node 102N via medium 104 is an idle packet, or is not an idle packet, based, at least in part, upon the number of symbol levels comprised in the received packet. For example, if a packet comprises only 3 symbol levels, then the packet may be an idle packet. However, in accordance with the Ethernet communication protocol, if the packet comprises 5 symbol levels, then this indicates that the packet is not an idle packet. Thus, in this embodiment, if circuitry 48 detects receipt by receiver 46 of a packet that comprises 5 symbol levels, the circuitry 48 may determine that the received packet is not an idle packet, and therefore, the one or more symbols and/or values comprised in the packet may indicate that the idle condition, determined to exist as result of operation 302, has terminated.

After, and in response to, at least in part, detection by circuitry 48 of receipt by receiver 46 of one or more packets 64 transmitted from node 102N, circuitry 48 may signal circuitry 40 and/or circuitry 38. As shown by operation 308 in FIG. 3, this may result in circuitry 40 and/or circuitry 38 determining that the idle condition, determined to exist as a result of operation 302, has terminated. This may result in circuitry 40 and/or circuitry 38 signaling transceiver circuitry 42. This may result in re-activation, at least in part, of receiver 46, de-activation of detector circuitry 48, and transmission by transmitter 44 of one or more packets 62 to node 102N, as illustrated by operation 310. In this embodiment, one or more packets 62 may comprise and/or indicate, in accordance with this embodiment, one or more control symbols and/or values, in accordance with an Ethernet communication protocol, that may indicate to node 102N that receiver 46 is not ready to receive additional packets via medium 104, and therefore, it is desired that node 102N refrain, for one or more predetermined time intervals after receiving one or more packets 62, from transmitting any additional packets to receiver 46. In accordance with this embodiment, these one or more predetermined time intervals may be greater than or equal to a time interval sufficient for receiver 46 to become fully operational, but less than a predetermined maximum network communication time-out period defined in an Ethernet communication protocol (e.g., several hundred milliseconds). After 102N receives one or more packets 62, node 102N may refrain from transmitting any packets to receiver 46 during these one or more predetermined time intervals.

After receiver 46 has again become fully operational, circuitry 40 and/or circuitry 38 may signal transceiver circuitry 42. This may result in transmitter 44 transmitting one or more additional packets 66 to node 102N via medium 104. One or more packets 66 may contain one or more symbols and/or values that may indicate to node 102N that receiver 46 is fully operational and ready to receive one or more packets that may be transmitted by node 102N to receiver 46.

Thereafter, or contemporaneously with execution of operation 312, processor 12 may signal circuitry 38. This may result in circuitry 38 signaling circuitry 40 and/or circuitry 42. This may result in transmitter transmitting to node 102N one or more packets 68 via medium 104. One or more packets 68 may comprise one or more symbols and/or values 70 requesting that node 102N re-transmit one or more packets comprised in one or more packets 64, as illustrated by operation 314. This request may be made to node 102N since, as a result of receiver 46 having been de-activated, at least in part, during at least a portion of the time during which one or more packets 64 may have been propagated to receiver 46, one or more of one or more packets 64 may not have been properly received by receiver 46. The signaling of circuitry 38 by processor 12 may be initiated as a result of, for example, execution by processor 12 of application and/or transport layer program processes. Thereafter, circuitry 38 and/or circuitry 40 may periodically determine whether an idle condition again exists with respect to the communication of circuitry 40 with node 102N, and if such condition again exists, may operations 300 may recommence with execution of operation 302.

Figure 4:
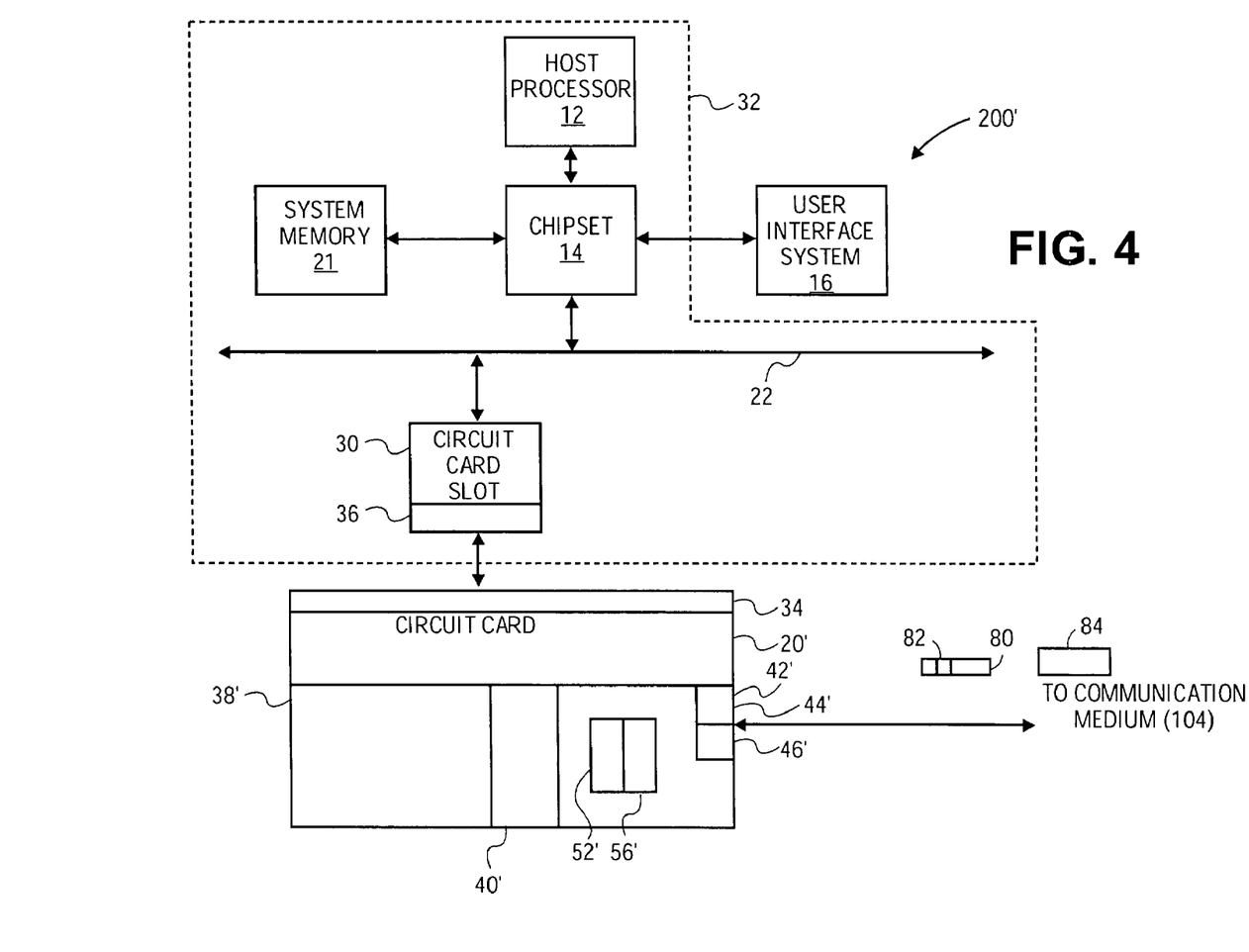
FIG. 4 illustrates another system embodiment.

Turning now to FIG. 4, FIG. 4 illustrates the construction of another system embodiment 200' of the claimed subject matter. In network 100, each of the nodes 102A . . . 102N may comprise one or more respective systems that may be substantially identical (e.g., in terms of construction and/or operation) to system 200'. Alternatively, without departing from this embodiment, one or more of the nodes 102A . . . 102N may not comprise one or more systems that are substantially identical to system 200'.

Connector 36 may be electrically and mechanically mated with a PCI bus connector 34 that is comprised in circuit card 20'. Slot 30 and card 20' may be constructed to permit card 20' to be inserted into slot 30. When card 20' is properly inserted into slot 30, connectors 34 and 36 may become electrically and mechanically coupled to each other. When connectors 34 and 36 are so coupled to each other, operative circuitry 38' in card 20' becomes electrically coupled to bus 22.

When circuitry 38' is electrically coupled to bus 22, host processor 12 may exchange data and/or commands with circuitry 38', via chipset 14 and bus 22 that may permit host processor 12 to control and/or monitor the operation of circuitry 38'. Circuitry 38' may include network interface circuitry 40'. Circuitry 40' may comprise computer-readable memory 52' and transceiver circuitry 42'. Memory 52' may comprise read only and/or random access memory that may store program instructions 56'. These program instructions 56', when executed, for example, by operative circuitry 38', network interface circuitry 40', and/or transceiver circuitry 42' may result in, among other things, circuitry 38', circuitry 40', and/or circuitry 42' executing operations that may result in system 200' carrying out the operations described herein as being carried out by system 200'.

Without departing from this embodiment, instead of being comprised in card 20', some or all of operative circuitry 38' may be comprised in other structures, systems, and/or devices that may be, for example, comprised in motherboard 32, coupled to bus 22, and exchange data and/or commands with other components in system 200'. For example, without departing from this embodiment, chipset 14 may comprise one or more integrated circuits that may comprise operative circuitry 38'. Additionally, without departing from this embodiment, system 200' may include a plurality of cards, identical in construction and/or operation to card 20', coupled to bus 22 via a plurality of circuit card slots identical in construction and/or operation to slot 30.

Transceiver circuitry 42' may be communicatively coupled to medium 104. Medium 104 may comprise one or more optical and/or electrical cables. In this embodiment, circuitry 42' may be optically and/or electrically coupled to, and may be capable of transmitting and receiving signals and/or packets via, these one or more cables. More specifically, circuitry 42' may comprise a transmitter 44' and a receiver 46' that may be coupled to medium 104 such that transmitter 44' may transmit, and receiver 46' may receive, respectively, one or more signals and/or packets via medium 104.

Figure 5:
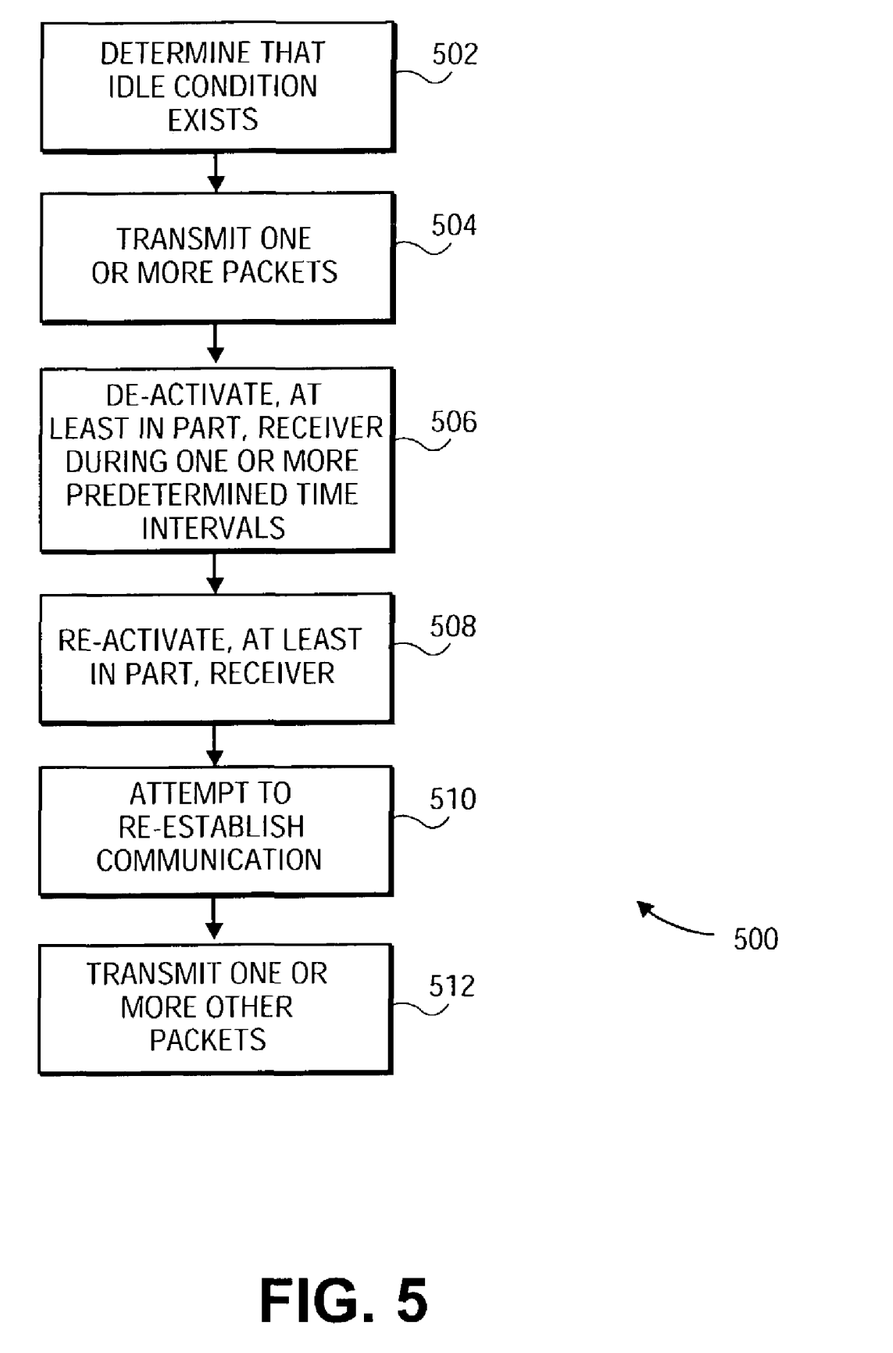
FIG. 5 is a flowchart illustrating operations that may be performed according to another embodiment.

With particular reference now being made to FIG. 5, operations 500 that may be carried out in system 200' in accordance with one embodiment will be described. For purposes of the present discussion, system 200' will be described as being comprised in node 102A. However, as stated previously, each of the nodes 102A . . . 102N in network 100 may comprise a respective system that is identical to system 200'. Thus, each of the nodes 102A . . . 102N may be capable of executing respective sets of operations that may be substantially identical to operations 500; these sets of operations may be executed substantially contemporaneously in network 100, alternatively, one or more of these sets of operations may not be executed contemporaneously with one or more other sets of such operations.

After, for example, a reset of card 20' and/or system 200', circuitry 38' may signal circuitry 40'. This may result in circuitry 40' attempting to negotiate with one or more network communication partners (e.g., node 102N), for example, in accordance with an Ethernet protocol, initialization of communication with node 102N in accordance with such protocol. More specifically, circuitry 40' may signal circuitry 42'. This may result in circuitry 42' transmitting to, and receiving from node 102N one or more packets that may result in and/or embody such negotiation and initialization of communication with node 102N.

Thereafter, as illustrated by operation 502 in FIG. 5, circuitry 38' and/or circuitry 40', are capable of determining whether, and may determine that, an idle condition exists with respect to the communication of circuitry 40' with node 102N. In this embodiment, if circuitry 40' and/or circuitry 38' determine that transmitter 44' and/or receiver 46' are idle, circuitry 40' and/or circuitry 38' may determine, as a result of operation 502, that an idle condition exists in the communication of circuitry 40'. Thereafter, in response, at least in part to the determination made as a result of operation 502, circuitry 38' and/or circuitry 40' may signal transceiver circuitry 42'. This may result in transmitter 44' transmitting one or more flow control packets 80 to node 102N, as illustrated by operation 504, and may also result in de-activation, at least in part, of receiver 46' during one or more predetermined time intervals, as illustrated by operation 506. One or more packets 80 may comprise one or more flow control symbols and/or values 82, in accordance with an Ethernet communication protocol, that may indicate to node 102N that receiver 46' is not ready to receive additional packets via medium 104, and therefore, it is desired that node 102N refrain, for one or more predetermined time intervals (e.g., about 30 milliseconds each) after receiving one or more packets 80, from transmitting any additional packets to receiver 46'. For example, one or more flow control symbols and/or values 82 may be interpreted by node 102N as indicating that one or more receive buffers (not shown) comprised in receiver 46' may be full, and as a result, receiver 46' is not ready to receive any additional packets from node 102N. In response, at least in part, to receipt of one or more packets 80, node 102N may refrain from transmitting, during one or more predetermined time intervals following the receipt of one or more packets 80, any additional packets to receiver 46'. If the duration of these one or more predetermined time periods is longer than greater than, for example, a maximum communication time-out period defined in an Ethernet communication protocol, transmitter 44' may periodically transmit to node 102N one or more additional sets of one or more packets 80 in order to ensure that node 102N does not determine that such a communication time-out condition exists in its communication with node 102A. During these one or more predetermined time periods, system 200' may be disabled from determining that such a time-out condition exists in its communication with node 102N.

After or contemporaneous with the expiration of these one or more predetermined time periods, circuitry 38' and/or circuitry 40' may signal transceiver 42'. This may result in re-activation, at least in part, of receiver 46', as illustrated by operation 508, and after receiver 46' is once again fully operational, may result in an attempt to re-establish communication between receiver 46' and node 102N, as illustrated by operation 510, and also may result in transmission from transmitter 44 to node 102N of one or more other packets 84, as illustrated by operation 512. For example, in this embodiment, as part of operation 510, transceiver 42' may attempt to exchange one or more packets with node 102N that may embody one or more attempts to verify whether an active communication link, in accordance with an Ethernet communication protocol, still exists between circuitry 40' and node 102N. If, as a result of such attempts, circuitry 38' and/or circuitry 40' determine that such an active communication link no longer exists, circuitry 38' may signal circuitry 40'. This may result in circuitry 40' attempting to negotiate with one or more network communication partners (e.g., node 102N), for example, in accordance with an Ethernet communication protocol, re-initialization of communication with node 102N in accordance with such protocol.

Conversely, after circuitry 38' and/or circuitry 40' determine that an active communication link still exists between circuitry 40' and node 102N, or alternatively, after the re-initialization of communication with node 102N, transmitter 44' may transmit to node 102N one or more other packets 84, as illustrated by operation 512. One or more packets 84 may comprise one or more flow control packets that may comprise one or more symbols and/or values that may indicate to node 102N that receiver 46' is once again ready to receive one or more packets that may be transmitted by node 102N to receiver 46'. For example, these one or more symbols and/or values in one or more packets 84 may indicate to node 102N that one or more receive buffers (not shown) in receiver 46' are at least partially empty, and receiver 46' is ready to receive one or more additional packets that may be transmitted to receiver 46' by node 102N. Thereafter, circuitry 38' and/or circuitry 40' may periodically determine whether an idle condition again exists with respect to the communication of circuitry 40' with node 102N, and if such condition again exists, may operations 500 may recommence with execution of operation 502.

Thus, a system embodiment may comprise a circuit board that comprises a circuit card slot, and a circuit card capable of being coupled to the slot. The circuit card of this embodiment may comprise circuitry capable of de-activating, at least in part, the receiver, in response, at least in part, to a determination that an idle condition exists. The circuitry of this embodiment also may be capable of transmitting one or more packets that indicate, at least in part, that the receiver is at least one of idle and ready to receive. The circuitry of this embodiment may additionally be capable of re-activating, at least in part, the receiver, in response, at least in part, to a determination that the idle condition has terminated. The circuitry of this embodiment also may be capable of transmitting one or more other packets that indicate, at least in part, that a transmitter is desired to refrain from transmitting to the receiver.

Another system embodiment may comprise a circuit board that comprises a circuit card slot, and a circuit card capable of being coupled to the slot. The circuit card of this embodiment may comprise circuitry that is capable of transmitting, in response, at least in part, to a determination that an idle condition exists, one or more packets to indicate, at least in part, that a transmitter is desired to refrain from transmitting, during one or more predetermined time intervals, to a receiver. The circuitry of this embodiment also being capable of, in response at least in part to the determination that the idle condition exists, de-activating, at least in part, the receiver during the one or more predetermined time intervals.

Thus, in these system embodiments, the receiver may be de-activated during one or more periods of time in which an idle condition may exist. Advantageously, this may significantly reduce the amount of electrical power consumed by the receiver.

The terms and expressions which have been employed herein are used as terms of description and not of limitation, and there is no intention, in the use of such terms and expressions, of excluding any equivalents of the features shown and described (or portions thereof), and it is recognized that various modifications, variations, alternatives, and equivalents are possible within the scope of the claims. For example, receivers 46 and 46' and/or transmitters 44 and 44' may comprise respective circuitry that may enable the receivers and/or transmitters to exchange packets via respective pluralities of transmission and/or reception channels. Activation and de-activation, at least in part, of these receivers in accordance with these embodiments may be carried out such that the respective circuitry used by these receivers to communicate via these respective channels may be activated or de-activated when the receivers are activated or de-activated, at least in part, with the exception that, for example, if one or more of these channels is used to transmit a clock signal for use in synchronizing data transmission and/or recovery via medium 104, these one or more channels may not be de-activated in accordance with embodiments described herein. Accordingly, the claims are intended to cover all such modifications, variations, alternatives, and equivalents.

What is claimed is:

1. A system comprising:
 a circuit board comprising:
  a circuit card slot;
  a circuit card coupled to the slot, the circuit card comprising:
   circuitry coupled to transmit from the circuit card, in response to a determination that an idle condition with respect to network communication exists, one or more packets to indicate that a transmitter at a remote node is to refrain from transmitting, during one or more predetermined time intervals, to a receiver at the circuit card, wherein the one or more predetermined time intervals are predetermined prior to transmitting the one or more packets from the network interface to the remote node, de-activate the receiver at the circuit card during the one or more predetermined time intervals and detect receipt of one or more packets at the receiver during the idle condition, wherein a receipt of a packet having a first number of symbol levels indicates that the idle condition is to continue and receipt of a packet having a second number of symbol levels indicates that the idle condition has terminated.

2. The system of claim 1, wherein: the circuit board comprises a bus and a host processor coupled to the bus; and when the circuit card is coupled to the slot, the circuitry is coupled to the bus.

3. The system of claim 1, wherein: the communication protocol is an Ethernet protocol.

4. The system of claim 1, further comprising: a cable to couple the receiver to the transmitter, and to propagate the one or more packets.

5. An article comprising:
 a non-transitory computer readable storage medium having stored thereon instructions that when executed by a machine result in the following:
  in response to a determination at a network interface that an idle condition with respect to a communication of the network interface exists, transmitting one or more packets from the network interface to a remote node to indicate that a transmitter at the remote node is to refrain from transmitting, during one or more predetermined time intervals, to a receiver at the network interface, wherein the one or more predetermined time intervals are predetermined prior to transmitting the one or more packets from the network interface to the remote node;
  de-activating the receiver at the network interface during the one or more predetermined time intervals; and
  activating circuitry at the network interface to detect receipt of one or more packets at the receiver during the idle condition, wherein a receipt of a packet having a first number of symbol levels indicates that the idle condition is to continue and receipt of a packet having a second number of symbol levels indicates that the idle condition has terminated.

6. The article of claim 5, wherein: the one or more packets comprise one or more flow control packets in accordance with an Ethernet protocol.

7. The article of claim 5, wherein the instructions when executed by the machine also result in: after the de-activating, at least in part, of the receiver, re-activating the receiver; and attempting to re-establish communication with the transmitter.

8. The article of claim 5, wherein: the one or more packets indicate that the receiver is not ready to receive one or more other packets from the transmitter.

9. The article of claim 5, wherein the instructions when executed by the machine also result in:
 re-activating the receiver; and
 transmitting one or more other packets to indicate that the transmitter is no longer desired to refrain from transmitting to the receiver.

10. The article of claim 5, wherein the instructions when executed by the machine also result in: determining whether the idle condition exists.

11. An apparatus comprising:
 circuitry for transmitting from a network interface, in response to a determination that an idle condition with respect to network communication exists, one or more packets to indicate that a transmitter at a remote node is to refrain from transmitting, during one or more predetermined time intervals, to a receiver at the network interface, wherein the one or more predetermined time intervals are predetermined prior to transmitting the one or more packets from the network interface to the remote node, de-activating the receiver at the network interface during the one or more predetermined time intervals and detecting receipt of one or more packets at the receiver during the idle condition, wherein a receipt of a packet having a first number of symbol levels indicates that the idle condition is to continue and receipt of a packet having a second number of symbol levels indicates that the idle condition has terminated.

12. The apparatus of claim 11, wherein: the one or more packets comprise one or more flow control packets in accordance with an Ethernet protocol.

13. The apparatus of claim 11, wherein: the circuitry is also for, after the de-activating of the receiver, re-activating the receiver; and the circuitry is also capable of attempting to re-establish communication with the transmitter.

14. The apparatus of claim 11, wherein: the one or more packets indicate that the receiver is not ready to receive one or more other packets from the transmitter.

15. The apparatus of claim 11, wherein: the circuitry is also for, after the de-activating of the receiver, re-activating the receiver; and the circuitry is also capable of transmitting one or more other packets to indicate that the transmitter is no longer desired to refrain from transmitting to the receiver.

16. The apparatus of claim 11, wherein: the circuitry is also for determining whether the idle condition exists.

17. A method comprising:
in response to a determination at a network interface that an idle condition with respect to a communication of the network interface exists, transmitting one or more packets from the network interface to a remote node to indicate that a transmitter at the remote node is to refrain from transmitting, during one or more predetermined time intervals, to a receiver at the network interface, wherein the one or more predetermined time intervals are predetermined prior to transmitting the one or more packets from the network interface to the remote node;
de-activating the receiver at the network interface during the one or more predetermined time intervals; and
activating circuitry at the network interface to detect receipt of one or more packets at the receiver during the idle condition, wherein a receipt of a packet having a first number of symbol levels indicates that the idle condition is to continue and receipt of a packet having a second number of symbol levels indicates that the idle condition has terminated.

18. The method of claim 17, wherein: the one or more packets comprise one or more flow control packets in accordance with an Ethernet protocol.

19. The method of claim 17, wherein: after the de-activating of the receiver, re-activating the receiver; and attempting to re-establish communication with the transmitter.

20. The method of claim 17, wherein: the one or more packets indicate that the receiver is not ready to receive one or more other packets from the transmitter.

21. The method of claim 17, further comprising:
re-activating the receiver; and transmitting one or more other packets to indicate that the transmitter is no longer desired to refrain from transmitting to the receiver.

22. The method of claim 17, further comprising: determining whether the idle condition exists.

* * * * *